Header area 3,651,231
PROCESS FOR PREPARING LACTOGENIC
FACTOR
Samuel H. Eppstein, Charleston Township, Kalamazoo
 County, Mich., assignor to The Upjohn Company,
 Kalamazoo, Mich.
No Drawing. Continuation-in-part of application Ser. No.
 362,938, Apr. 27, 1964, now Patent No. 3,275,516, and
 a continuation of application Ser. No. 522,401, Jan. 24,
 1966. This application Sept. 10, 1969, Ser. No. 857,643
Int. Cl. A61k 17/08
U.S. Cl. 424—108                                    2 Claims

ABSTRACT OF THE DISCLOSURE

An improved process for the purification of lactogenic factor of porcine pituitaries utilizes a combination of simple elution chromatography and displacement chromatography to provide greater chromatographic selectivity and resolution of components.

---

This application is a continuation-in-part of application Ser. No. 362,938, filed Apr. 27, 1964 now U.S. Pat. 3,275,516 and a continuation of Ser. No. 522,401 filed Jan. 24, 1966.

This invention relates to a process of preparing lactogenic factor of porcine pituitary glands, more particularly a process wherein the said lactogenic factor is applied to and eluted from the anion exchanger diethylaminoethyl cellulose.

Diethylaminoethyl cellulose chromatography is described in my copending application Ser. No. 362,938, filed Apr. 27, 1964. The chromatography therein yields a main elution peak which is almost symmetrical in shape. However, lactogenic factor in such a main elution peak manifests microheterogenicity in gel electrophoresis. In basic acrylamide gel, Peacock et al., Science 147: 1451 (1965), all material moves toward the anode separating into a number of protein bands (five or more). Several very minor bands are observed plus three prominent bands. Prominent band No. 1 comprises a major component often associated with a small amount of slightly more mobile protein, forming a doublet; the second prominent band is a doublet of high concentration of one component preceded by a somewhat lesser concentration of a slightly more mobile component; prominent band No. 3 has not been resolved into more than one component. The three prominent bands are numbered from point of origin, the more mobile being No. 3. Whenever material prepared by the diethylaminoethyl cellulose procedure of Ser. No. 362,938 is subjected to rechromatography, no further resolution is obtained; the ascending and descending limbs of the symmetrical peak of eluate show the same protein pattern in gel electrophoresis.

It has now been found that a modified technique of applying the lactogenic factor to the diethylaminoethyl cellulose results in a separation of the aforesaid various components, since they change in concentration in a gradual way in the eluate from the diethylaminoethyl cellulose. The exact technique of elution can be varied, depending upon what is most satisfactory for a given starting material and the desired results. Essentially, the lactogenic factor is applied to the diethylaminoethyl cellulose in a sufficent quantity to saturate the diethylaminoethyl cellulose before elution is started. Generally, the sufficiency of the applied lactogenic factor to saturate the diethylaminoethyl cellulose is ascertainable by appearance of protein and increased absorbance at 280 m$\mu$ in the eluate, as soon as the holdup volume of the particular amount of diethylaminoethyl cellulose has been collected.

In the case of a diethylaminoethyl cellulose having 0.9±0.1 milliequivalents per gm. (Selectacel) and packed in a column at 9 lbs. pressure sufficient lactogenic factor is applied to provide a ratio of 1 gm. to from about 20 ml. to about 70 ml. of bed volume, preferably 1 gm. to about 23 ml. Gravity settling is satisfactory in the case of Sephadex A–50 (about 2.8 milliequivalents per gm.). Applying the aforesaid sufficient quantity of lactogenic factor to the diethylaminoethyl cellulose results in the follownig conditions. Instead of simple elution chromatography, wherein the ionic strength of the eluant preferentially elutes certain components, depending upon their pKa's and other factors, displacement chromatography also ensues, wherein the components having greater affinity to the diethylaminoethyl cellulose displace those of lesser affinity, in a word, pushing them further down the column. It is this combination of the elution principles which leads to greater chromatographic selectivity and resolution, as will be hereinafter apparent.

The pH range of the eluant varies from about 8 to about 10 and the ionic strength varies from about 0.01$\mu$ to about 0.5$\mu$. Tris buffer, tris(hydroxymethyl)aminomethane, acid adjusted, or bicarbonate- carbonate buffer can be utilized, preferably tris-hydrochloric acid buffer of pH about 8.2. Generally, a pH below about 8.0 is to be avoided because of lessened solubility of the lactogenic factor and the higher pH values are avoided because of possible deactivation of the protein-like lactogenic factor.

As used herein, diethylaminoethyl cellulose means diethylaminoethyl cellulose (capacity about 0.9 milliequivalent per gm.) or an equivalent such as a cross-linked dextran gel containing diethylaminoethyl groups (Sephadex A–50, capacity about 2.8 milliequivalents per gm., Pharmacia Fine Chemicals, Inc.).

As is known to those skilled in the art, lactogenic factor can be obtained from fresh porcine pituitaries, acetone-dessicated porcine pituitaries and porcine pituitaries dried by freeze-drying. Extraction of such pituitaries with acidified water, glacial acetic acid, 40% acetic acid in methanol, or like solvent yields crude extracts. Other biologically active materials in the extracts, for example, adrenocorticotropic hormone can be removed by absorption thereof onto oxycellulose powder, for example from dilute acetic acid solution. Thereafter the pH of the dilute acetic acid solution is raised to about 10.5, lowered to pH about 7 with sodium hydroxide and any soluble material filtered or centrifuged off to provide a solution of lactogenic factor. A dry lactogenic material can be conveniently prepared from the acetic acid filtrate after removal of adrenocorticotropic hormone on oxycellulose by adjustment of pH to within the range 7 to 8, filtration of this solution and removal of any insoluble material, and precipitation of the lactogenic factor from the clear filtrate by adding sufficient ethanol to make a concentration of about 42.5%. The precipitate is dialyzed at 4° C. and lyophilized to yield a soluble powder. Alternatively, a pH 8 aqueous solution of the alcoholic precipitate can be isoelectrically precipitated at pH about 4.95, and the precipitate dialyzed at 4° C. and lyophillzed to yield a starting lactogenic factor for solution in the tris buffer. Yet another preparation of suitable starting material can be prepared by directly precipitating at pH 4.95 an active prolactin from a 0.1 N acetic acid solution thereof to obtain an isoelectric precipitate, which is redissolved at pH about 8 and reprecipitated isoelectrically at pH 4.95. Thereafter the precipitate is dialyzed at 4° C. and lyophilized. Likewise suitable for solution in the tris buffer is a retarded lactogenic factor fraction obtained by passage over Sephadex G–75. As is known to those skilled in the art, porcine lactogenic factor is useful for maintenance of lactation in rabbits and rats for breeding purposes and to increase broodiness in hens.

The following examples set forth how to perform the inventive process and the best mode contemplated of carrying out the invention but are not to be construed as limiting.

EXAMPLE 1

Fifty-five gms. of crude lactogenic factor was obtained from alcoholic precipitate of 0.1 N acetic acid filtrate from preparation of adrenocorticotropic hormone by twice isoelectrically precipitating at pH 4.95 from a solution of pH 8. The 55 gms. was dissolved in 550 ml. of tris buffer, $0.01\mu$. The solution was applied to a diethylaminoethyl cellulose column measuring 48 mm. x 72 cm. The elution technique is as described below. Tube volumes of about 18 ml. were collected.

ELUTION

| $\mu$ | Vol. (ml.) | Change over (tube No.) |
|---|---|---|
| 0.01 | 3500 | |
| 0.01→0.05 [1] | 1300 each | 140 |
| 0.05→0.1 [1] | 500 each | [2] 278 |
| 0.1 | 2400 | 314 |
| 0.5 | 4100 | 447 |
| 1.0 | 4400 | 1101 |
| N/10 NaOH | 5300 | |

[1] Linear gradients.
[2] At tube 314 the remaining 375 ml. of this gradient was discarded and elution begun with $0.1\mu$ buffer.

Cuts were made as indicated below, the prolactin precipitated by pH adjustment to 4.95, then dialyzed and lyophilized.

| Fraction | Tubes | Wt. (gm.) | Activity (U./mg.) |
|---|---|---|---|
| 130.1 | | | |
| 130.2 | 398–560 | 22.2 | [1] 13.6 |
| 130.3 | 561–588 | 1.0 | 11.0 |
| 130.4 | 589–615 | 0.7 | 10.0 |
| 130.5 | 616–670 | 1.0 | 18.0 |
| 130.6 | 671–694 | 0.3 | 11.0 |
| 130.7 | 695–780 | 0.8 | 14.0 |
| 130.7a | 781–965 | 1.4 | 13.0 |
| 130.8 | 966–999 | 5.5 | 11.0 |
| 130.9 | 1,000–1,018 | 0.3 | 5.0 |
| 130.10 | 1,019–1,065 | 0.5 | 4.0 |
| 130.11 | 1,066–1,193 | 0.6 | 7.0 |
| 130.12 | 1,194–1,225 | 0.08 | 7.0 |
| 130.13 | 1,226–1,394 | 0.4 | 7.0 |
| 130.14 | 1,395–1,496 | 0.4 | 6.0 |
| 130.15 | 1,549–1,603 | 2.4 | 1.0 |
| 130.16 | 1,604–1,715 | 1.6 | 3.0 |

[1] Duplicate 3-level assay. The others are single level assays and only useful for relative general activity. Thus through fraction 8 the activity is probably high; beyond 8 the activity is probably very low.

Gel electropherograms showed that fraction 130.2 was a procine prolactin equivalent to that isolated in main elution peaks of my earlier chromatography. Fractions .3 to .7 (about 5 gms.) were about identical to each other but different from fraction .2 in being almost devoid of band No. 1 and in having a rather prominent band just prior to band No. 3. Fractions 8 and beyond yielded very formless patterns by gel electropherograms, and probably represent denaturized material.

EXAMPLE 2

The column used in Example 1 was regenerated. The charge was 52 gms. of crude lactogenic factor, obtained from ACTH isolation procedures (0.01 N acetic acid filtrate) by clarification at pH 8 and direct isoelectric precipitation at pH 4.95, the isoelectric precipitate being dialyzed at 4° C. and lyophilized. Ffty-two gms. of this lyophilized material was dissolved in 550 mls. of tris buffer $(0.01\mu)$. In this case the elution pattern was changed to a discontinuous gradient. However, the collected volume per tube was approximately 18 ml. as before. The elution pattern was as below:

| $\mu$ | Vol. (ml.) | Tube change |
|---|---|---|
| 0.01 | 3,600 | 95 |
| 0.05 | 9,700 | 516 |
| 0.1 | 7,800 | 957 |
| 0.5 | 6,360 | 1,313 |
| 1.0 | 3,040 | 1,485 |
| N/10 NaOH | 5,600 | |

At tube 131, because of malfunction of the collecting device, 1650 ml. of effluent were collected as a single fraction. All proteins were harvested by precipitation at pH 4.95. The supernatant was lowered to pH 3.5 and made 4% with NaCl. This precipitates additional material and leaves no prolactin in solution. The precipitates at pH 4.95 are designated P, the additional precipitate at pH 3.5 with salt is SP.

| Fraction | Tubes | P (gm.) | SP (gm.) |
|---|---|---|---|
| 133.1 | 132–175 | | 0.08 |
| 133.2 | 176–282 | 9.05 | 0.33 |
| 133.3 | 283–417 | 2.7 | 0.43 |
| 133.4 | 418–495 | 1.5 | 0.12 |
| 133.5 | 496–601 | 0.83 | 0.24 |
| 133.6 | 602–745 | 9.0 | 0.34 |
| 133.7 | 746–855 | 2.1 | 0.65 |
| 133.8 | 856–880 | 0.41 | |
| 133.9 | 881–929 | 0.29 | 0.15 |
| 133.10 | 930–948 | 0.18 | |
| 133.11 | 949–1,046 | 0.37 | 0.16 |
| 133.12 | 1,047–1,108 | 7.53 | 5.1 |
| 133.13 | 1,109–1,210 | 0.38 | 0.24 |
| 133.14 | 1,211–1,390 | 0.24 | 0.13 |
| 133.15 | 1,663–1,686 | 0.61 | |
| 133.16 | 1,687–1,720 | 0.94 | |
| 133.17 | 1,721–1,787 | 0.35 | |

Electropherograms showed that fraction .2P comprised mainly the less mobile component of band No. 1, with some more mobile component of band No. 1, and smaller amounts of band No. 2, the second prominent band. Fraction .2SP was similar but predominated in the more mobile component of the prominent band No. 1. Fraction .3P was about an equal mixture of bands No. 1 and No. 2. Fractions .4P and .5P predominated in band No. 2. Fraction .6P predominated in the doublet No. 2 and band 3. Fraction .7 had substantial amount of band No. 3 but predominated in a more mobile additional band. Fractions .8 and .9 were mainly two bands of a more mobile nature than Nos. 1, 2 and 3. Fractions .12P and .12SP are non-prolactins.

EXAMPLE 3

1.75 gm. of fraction 130.2 of Example 1 was dissolved in a total of 30 ml. of tris buffer of $0.01\mu$ by adjustment of the pH to 9.5 with 1 N sodium hydroxide and readjustment to pH 8.2 with 1 N hydrochloric acid. A clear solution was obtained by centrifuging. The solution was applied to a column of diethylaminoethyl cellulose (11 mm. x 40 cm.) which had been previously equilibrated with tris buffer, pH 8.2 and $0.01\mu$. Packing was brought about at 9 lbs. pressure. Tube volumes of about 5 ml. were collected at a flow rate of about 50 ml. per hour. The elution procedure with tris buffer of different ionic strengths was as follows:

| $\mu$ | Vol (mo.) | Tube change |
|---|---|---|
| 0.01 | 1,050 | 200 |
| 0.01→0.03 [1] | 500 each | 389 |
| 0.03 | 1,050 | 580 |
| 0.03→0.05 [1] | 400 each | 725 |
| 0.05 | 800 | 725 |
| 0.05→0.1 [1] | 200 each | 949 |
| Tris+4M NaCl | 320 | |

[1] Linear gradients.

Cuts were made of the eluate which were then dialyzed in cellophane tubing at 4° C. and freeze-dried. A sample of each freeze-dried material was examined in 5% acrylamide gel.

| Fraction | 1 | 2 | 3 | 4 | 5 | 6 | 7 | 8 | 9 | 10 | 11 | 12 | 13 |
|---|---|---|---|---|---|---|---|---|---|---|---|---|---|
| Tubes: | | | | | | | | | | | | | |
| From | 10 | 17 | 28 | 220 | 286 | 311 | 326 | 341 | 371 | 384 | 391 | 396 | 406 |
| To | 16 | 27 | 46 | 285 | 310 | 325 | 340 | 370 | 383 | 390 | 395 | 405 | 440 |
| Wt. (mg.) | 209 | 2 | 3 | 34 | 46 | 43 | 35 | 70 | 36 | 22 | 24 | 30 | 73 |
| Electropherogram, bands: | | | | | | | | | | | | | |
| A | | VF | | | | | | | | | | | |
| B | VF | VF | F | | | | | | | | | | |
| C | VF | F | S | M | F | VF | | | | | | | |
| 1a | S | F | M | VS | VS | VS | M | M | M | M | F | F | F |
| 1b | F | | F | M | M-S | M | F | F | F | F | VF | | |
| 2a | M | VF | VF | F | F | M | F | M | S | S | S | S | S |
| 2b | M | VF | VF | F | F | M | F | M | M-S | M-S | S | S | S |
| 3 | F | | | | | | | F | F | F | F | F | |
| D | | | | | | | | | | | | | |
| E | | | | | | | | | | | | | |

The main bands are designated by Nos. 1-3 with doublets indicated by sub-letters, whereas the minor bands are designated by letters alone
Symbols: V=very; M=moderate; F=faint; S=strong.

| Fraction | 14 | 15 | 16 | 17 | 18 | 19 | 20 | 21 | 22 | 23 | 24 | 25 | 130.2 |
|---|---|---|---|---|---|---|---|---|---|---|---|---|---|
| Tubes: | | | | | | | | | | | | | |
| From | 441 | 472 | 511 | 591 | 651 | 701 | 739 | 797 | 879 | 901 | 916 | 929 | |
| To | 471 | 510 | 590 | 650 | 700 | 738 | 796 | 878 | 900 | 915 | 928 | 958 | |
| Wt. (mg.) | 47 | 43 | 63 | 56 | 67 | 80 | 79 | 48 | 88 | 76 | 25 | 26 | |
| Electropherogram, bands: | | | | | | | | | | | | | |
| A | | | | | | | | | | | | | |
| B | | | | | | | | | | | | | |
| C | | | | | | | | | | | | | VF |
| 1a | F-M | F-M | F-M | VF | | | | | | | | | S |
| 1b | | | | | | | | | | | | | F |
| 2a | VS | VS | VS | VS | VS | F | VF | VF | T | | | | VS |
| 2b | S | VS | VS | VS | VS | F | VF | VF | T | | | | S |
| 3 | M | M | M-S | S | VS | VS | VS | VS | M | F | F¹ | | S |
| D | | | | | F | F | F | F-M | M | F-M | F¹ | | F-M |
| E | | | | | | | | | | F | F¹ | | |

¹ Streaky.
The main bands are designated by Nos. 1-3 with doublets indicated by sub-letters, whereas the minor bands are designated by letters alone
Symbols: V=very; S=strong; F=faint; T=trace; M=moderate; Underlined=extremely strong.

EXAMPLE 4

This separation was similar to that in Example 3, except that the 1.75 gm. of the lactogenic factor was applied in 4 M urea to a column thoroughly washed with urea. The column was 11 mm. by 40 cm. and was used at 4° C. The elution pattern was similar to that of Example 3, except that in the 4 M urea the protein elution at $0.01\mu$ eluant was increased. Gel electropherograms showed a separation similar to that in Example 3.

I claim:
1. A process for separating components of microheterogeneous lactogenic factor prepared from porcine pituitary gland comprising
   (a) solubilizing the said microheterogeneous lactogenic factor in a buffered aqueous solution of pH of from about 8 to about 10,
   (b) applying the said aqueous solution of microheterogeneous lactogenic factor to a bed of diethylaminoethyl cellulose so as to saturate said diethylaminoethyl bed volume,
   (c) eluting the said microheterogeneous lactogenic factor from the diethylaminoethyl cellulose with an aqueous tris(hydroxy-methyl) - amino-methane-acid buffer or carbonate-bicarbonate buffer having a pH of from about 8 to about 10 and an ionic strength of from about $0.01\mu$ to about $0.5\mu$ and,
   (d) recovering separated components of the microheterogeneous lactogenic factor from different portions of the eluate.
2. A process in accordance with claim 1 wherein the microheterogeneous lactogenic factor is applied to the bed of diethylaminoethyl cellulose so as to provide a ratio of 1 g. of said factor to from about 20 ml. to about 70 ml. of diethylaminoethyl cellulose bed volume.

References Cited
UNITED STATES PATENTS
3,098,792  7/1963  Reisfeld et al. _____ 424—108

SAM ROSEN, Primary Examiner